(12) United States Patent
Rick

(10) Patent No.: US 8,816,839 B1
(45) Date of Patent: Aug. 26, 2014

(54) PORTABLE SEAT BELT ALARM SYSTEM

(71) Applicant: William K. Rick, Las Vegas, NV (US)

(72) Inventor: William K. Rick, Las Vegas, NV (US)

(*) Notice: Subject to any disclaimer, the term of this patent is extended or adjusted under 35 U.S.C. 154(b) by 0 days.

(21) Appl. No.: 13/682,574

(22) Filed: Nov. 20, 2012

Related U.S. Application Data

(60) Provisional application No. 61/629,592, filed on Nov. 23, 2011.

(51) Int. Cl.
*B60Q 1/00* (2006.01)
*F16B 17/00* (2006.01)

(52) U.S. Cl.
CPC .. *B60Q 1/00* (2013.01); *F16B 17/00* (2013.01)
USPC ........ 340/457.1; 340/449; 340/447; 340/457; 340/459; 340/686.1; 180/268; 73/862; 455/575.2

(58) Field of Classification Search
CPC ....................................................... B60R 22/48
USPC ............... 180/268; 340/268, 447, 449, 457.1, 340/459, 686.1; 73/862.472, 862.391
See application file for complete search history.

(56) References Cited

U.S. PATENT DOCUMENTS

| | | | |
|---|---|---|---|
| 5,581,234 A | 12/1996 | Emery et al. | |
| 5,760,684 A * | 6/1998 | Orbach | 340/457.1 |
| 6,520,032 B2 * | 2/2003 | Resh et al. | 73/862.472 |
| 6,535,137 B1 | 3/2003 | Ryan | |
| 6,853,298 B1 | 2/2005 | Stojanowski | |
| 6,924,742 B2 | 8/2005 | Mesina | |
| 7,123,157 B2 | 10/2006 | Best | |
| 7,348,889 B2 | 3/2008 | Monzo et al. | |
| 7,383,911 B2 * | 6/2008 | Schondorf et al. | 180/268 |
| 2003/0098792 A1 | 5/2003 | Edwards et al. | |
| 2003/0122662 A1 | 7/2003 | Quinonez | |
| 2004/0119599 A1 * | 6/2004 | Stevenson et al. | 340/686.1 |
| 2004/0164856 A1 * | 8/2004 | Mesina | 340/457.1 |
| 2006/0144167 A1 * | 7/2006 | Kaijala et al. | 73/862.391 |
| 2009/0079557 A1 * | 3/2009 | Miner | 340/457.1 |
| 2010/0081488 A1 * | 4/2010 | Kim | 455/575.2 |
| 2010/0283593 A1 * | 11/2010 | Miller et al. | 340/447 |
| 2010/0302022 A1 * | 12/2010 | Saban | 340/459 |
| 2011/0267186 A1 * | 11/2011 | Rao et al. | 340/449 |
| 2013/0033373 A1 * | 2/2013 | Thomas | 340/457.1 |

* cited by examiner

*Primary Examiner* — Daniel Wu
*Assistant Examiner* — Israel Daramola
(74) *Attorney, Agent, or Firm* — Rob L. Phillips; Greenberg Traurig, LLP

(57) ABSTRACT

A seat belt alarm system to alert users to the presence of an infant or child, or disabled, infirm or elderly person in a vehicle. The seat belt alarm utilizes a portable bracket configured to removably attach to a female receptacle of a seat belt system. The bracket includes a tension mechanism positioned to be acted upon by a male buckle of a seat belt system when the male buckle of the seat belt system mates with the female receptacle of the seat belt system. In a depressed state, the tension mechanism activates a signal transmitter configured to transmit a local signal received by a signal receiver integrated in a keychain fob. When the keychain fob moves outside of a signal range (e.g., 10 feet) while the tension mechanism remains in a depressed state, an alarm and/or red indicator light on the keychain fob is/are activated.

16 Claims, 6 Drawing Sheets

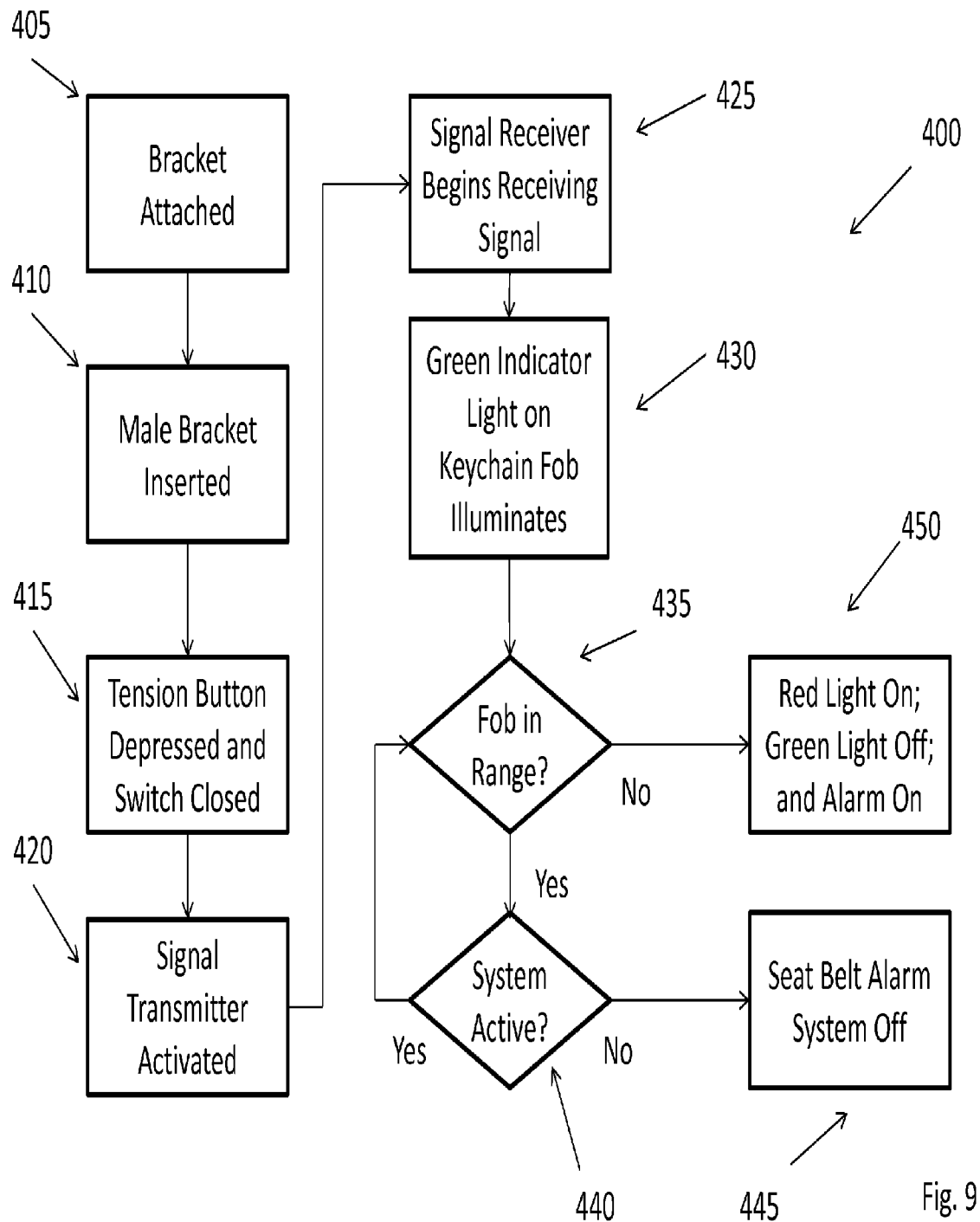

PORTABLE SEAT BELT ALARM SYSTEM

CROSS-REFERENCE

This application claims the benefit of U.S. Provisional Patent Application No. 61/629,592 filed Nov. 23, 2011 which is incorporated in its entirety herein for all purposes.

FIELD OF THE INVENTION

The embodiments of the present invention relate to a portable seat belt alarm configured to alert users to the presence of an infant or child in a vehicle thus preventing the infant or child from being left inadvertently in the vehicle. The portable seat belt alarm is also suitable for preventing the disabled, infirm and elderly from being left inadvertently in the vehicle.

BACKGROUND

Approximately 40 children die annually and many more suffer debilitating injuries after being left inadvertently in vehicles. The deaths are usually the result of heat stroke or hypothermia. A busy or hectic schedule is the primary cause behind a parent or guardian leaving a child in a vehicle inadvertently. In other words, the parent or guardian simply forgets that the child is in the vehicle. Similar occurrences can happen with the disabled, infirm and elderly.

It would be advantageous to develop a seat belt alarm system configured to alert users to the presence of an infant or child, or disabled, infirm or elderly person in a vehicle. More advantageously the seat belt alarm should be portable and adaptable to various seat belt types.

SUMMARY

The embodiments of the present invention involve a bracket configured to removably attach to a female receptacle of a seat belt system. In one embodiment, the bracket includes a tension mechanism positioned to be acted upon by a male buckle of a seat belt system when the male buckle of the seat belt system mates with the female receptacle of the seat belt system. In a depressed state, the tension mechanism activates a signal transmitter configured to transmit a local signal received by a signal receiver integrated into, or otherwise forming part of, a keychain fob. A green indicator light on the fob indicates that the signal is being received. When the keychain fob moves outside of a signal range (e.g., 10 feet) and the tension mechanism remains in a depressed state, an audible alarm and/or red indicator light on the keychain fob is/are activated.

The bracket is configured to fit on different seat belt types including factory-installed seat belt systems, infant seat belt systems and booster seat belt systems. The portability of the bracket allows it to be moved between the same types of, or different types of, seat belt systems providing users with flexibility and reduced costs.

Other variations, embodiments and features of the present invention will become evident from the following detailed description, drawings and claims.

BRIEF DESCRIPTION OF THE DRAWINGS

FIG. 9 illustrates a flow chart detailing a methodology of using the system according to the embodiments of the present invention.

DETAILED DESCRIPTION

Figure 1:
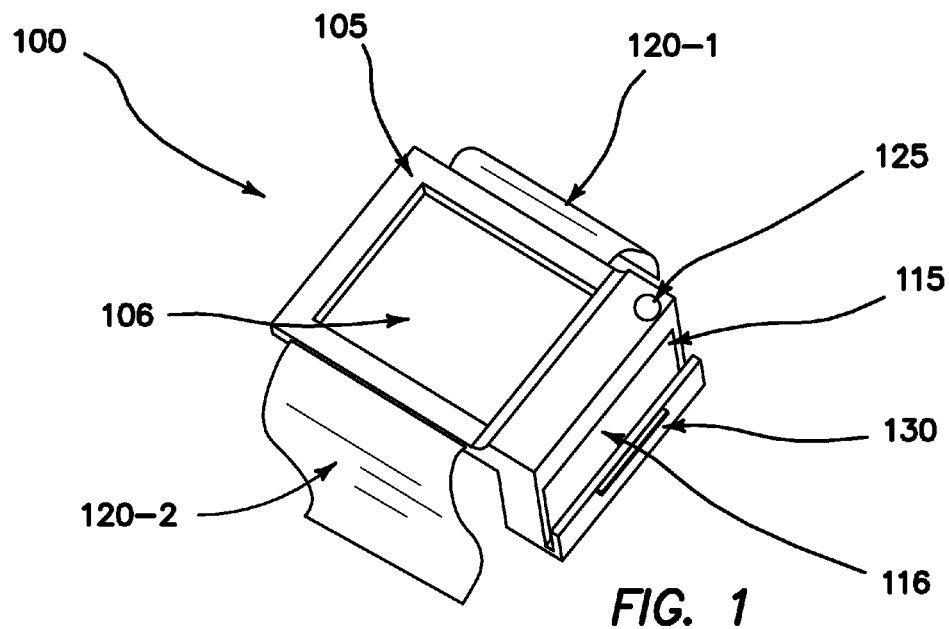
FIG. 1 illustrates a top perspective view of a portable bracket according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are directed to a system and method for protecting children and infants, along with the disabled, infirm and elderly, left in a vehicle inadvertently. The components, unless otherwise noted, may be fabricated of any number of suitable materials including, but not limited to, plastics, metals, alloys, polymers and/or composites and may be fabricated using any number of suitable techniques including, but not limited to, molding, machining, casting and rapid prototyping.

FIG. 1 shows a portable bracket 100 forming part of a seat belt alarm system 300 according to the embodiments of the present invention. The portable bracket 100 comprises a first arm 105 positioned to traverse a face 111 of a female receptacle 110 of a seat belt system and a second arm 115 positioned to traverse a locking slot face 112 of said female receptacle 110. In one embodiment, the second arm 115 is substantially orthogonal to said first arm 105. The first arm 105 may define a space 106 allowing user access to a seat belt system release button 113. The second arm 115 defines a space 116 for passage, and insertion into a locking slot 117 of said female receptacle 110, of a male buckle 114 associated with the seat belt system. The space 116 also allows user access to a seat belt system release button 119.

Opposite edges of the first arm 105 support hook and loop straps 120-1 and 120-2 dimensioned to wrap around the female receptacle 110 and connect to one another thereby removably attaching the portable bracket to the female receptacle 110. While hook and loop straps 120-1 and 120-2 are referenced herein, other suitable straps may include connection means in the form of snaps, buttons, ties, magnets and the like. An indicator light 125 on a face of the first arm 105 is configured to signify that a signal transmitter 310 integrated in the bracket 100 is active and transmitting a signal. The indicator light 125 may involve a light emitting diode (LED) or other illumination device. In one embodiment, the indicator light 125 is green to signify the signal transmitter 310 is active and transmitting a signal. Those skilled in the art will recognize that other colors may serve the same purpose.

A tension button 130 positioned on said second arm 115 is positioned such that, when said male buckle 114 is inserted into the locking slot 117 of said female receptacle 110, the tension button 130 is depressed by the male buckle 114 causing a switch 330 to close thereby activating the signal transmitter 310. In one embodiment, the tension button 130 is spring-biased such that the tension button 130 is urged outward from a front surface of said second arm 115 and the switch 330 is open until the male buckle 114 is inserted in the locking slot 117 causing the tension button 130 to be forced inward closing the switch 330. Other means may be used to maintain the tension button 130 in an outward position when the male buckle 114 is not inserted in the locking slot 117 and to allow inward movement of the tension button 130 when the male buckle 114 is inserted into the locking slot 117.

Figure 2:
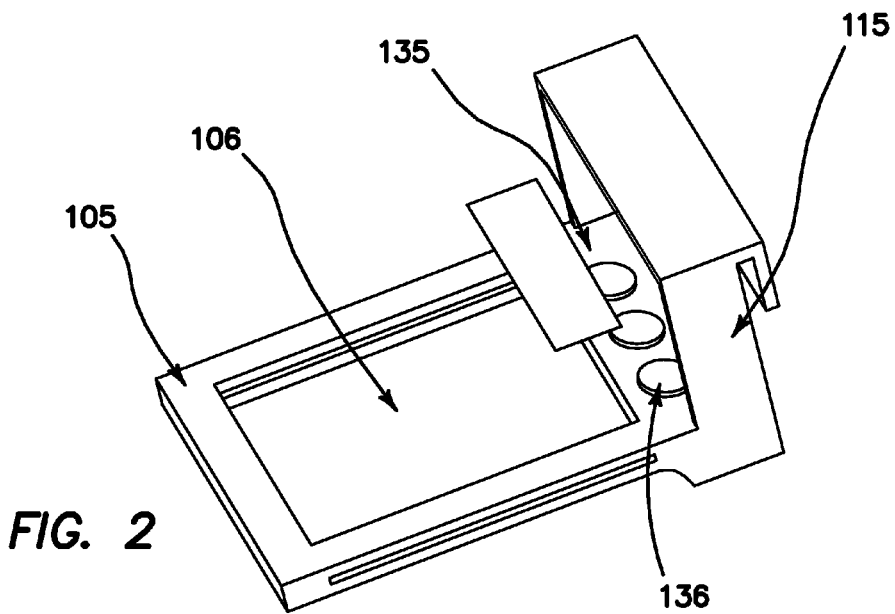
FIG. 2 illustrates an underside view of the portable bracket with a battery compartment exposed according to the present invention.

Now referring to FIG. 2, in one embodiment, an underside of the first arm 105 includes a battery compartment 135. As shown, three circular batteries 136 drive the indicator light 125 and signal transmitter 310 contained within the bracket 100. Power is provided to both the indicator light 125 and signal transmitter 310 responsive to the switch 330 being closed. The battery compartment 135 may be integrated in any suitable location within the bracket 100 without departing from the spirit and scope of the present invention.

Figure 3A:
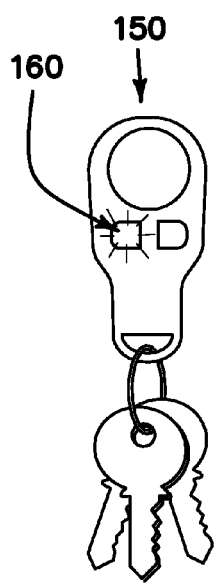
FIGS. 3a-3c illustrate a keychain fob according to the embodiments of the present invention.
Figure 3B:
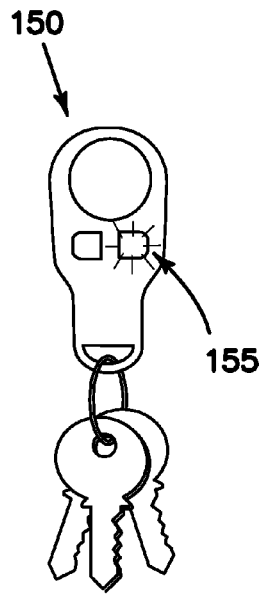
Figure 3C:
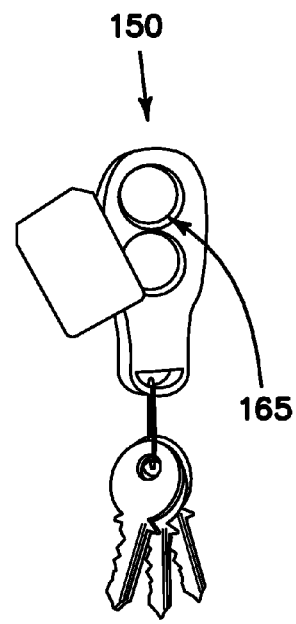

FIGS. 3a-3c show a keychain fob 150 with an integrated signal receiver 340 for receiving a signal transmitted by signal transmitter 310. While a keychain fob 150 is referenced herein, a key-chain, key ring or other key holding device may incorporate the signal receiver and other components detailed herein. The keychain fob 150 includes a red indicator light 155 and green indicator light 160. When illuminated, the green indicator light 160 indicates that the signal is being received by the signal receiver 340 from the signal transmitter 310. In other words, the seat belt alarm system 300 is active and the keychain fob 150 is in range of the signal transmitter 330. When illuminated, the red indicator light 155 indicates that the key fob 150 is out of range of the signal transmitter 310 and the seat belt alarm system 300 remains active such that a person remains belted in the vehicle. The red indicator light 155 may act as a strobe light or flash to make it more noticeable. An integrated audible alarm 350 also activates responsive to the keychain fob 150 moving out of range of the signal transmitter 310 while the seat belt alarm system 300 remains active. A battery compartment 165 drives the keychain fob 150.

Figure 4A:
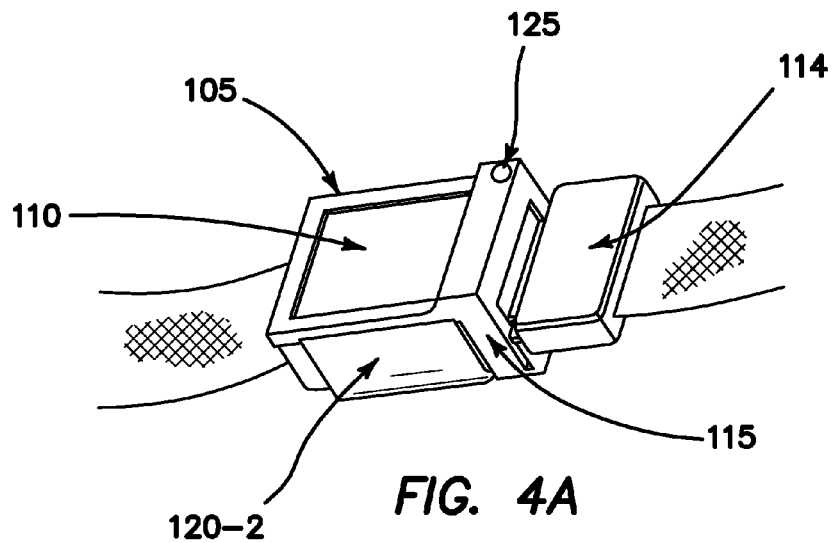
FIGS. 4a and 4b illustrate top and side perspective views of the bracket attached to a female receptacle of a seat belt system with a side-positioned release button according to the embodiments of the present invention.
Figure 4B:
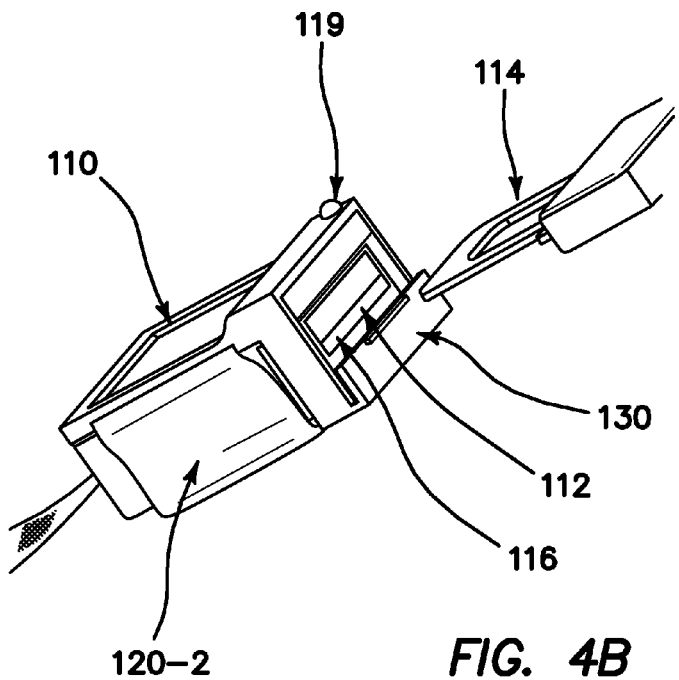
Figure 5:
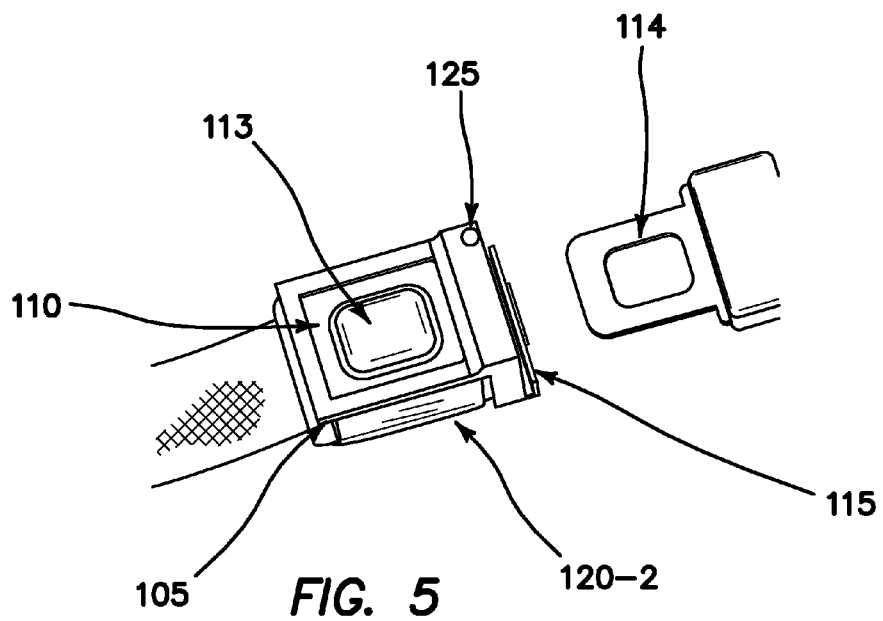
FIG. 5 illustrates a top perspective view of the bracket attached to a female receptacle of a seat belt system with a top-positioned release button according to the embodiments of the present invention.

FIGS. 4a and 4b illustrate top and side perspective views of the bracket 100 attached to the female receptacle 110 of a seat belt system with a side-positioned release button 119 according to the embodiments of the present invention. The straps of hook and loop fasteners 120-1 and 120-2 secure the bracket 100 to the female receptacle 110. Once the bracket 100 is in position, the tension button 130 is positioned for depression by the male buckle 114 to activate the seat belt alarm system 300. FIG. 5 illustrates a top perspective view of the bracket 100 attached to the female receptacle 110 of a seat belt system with a top-positioned release button 113 according to the embodiments of the present invention.

Figure 6:
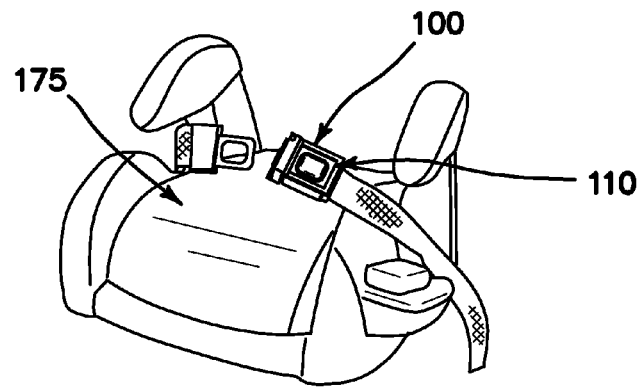
FIG. 6 illustrates a front perspective view of the bracket attached to a female receptacle of a seat belt system of a booster seat according to the embodiments of the present invention.
Figure 7:
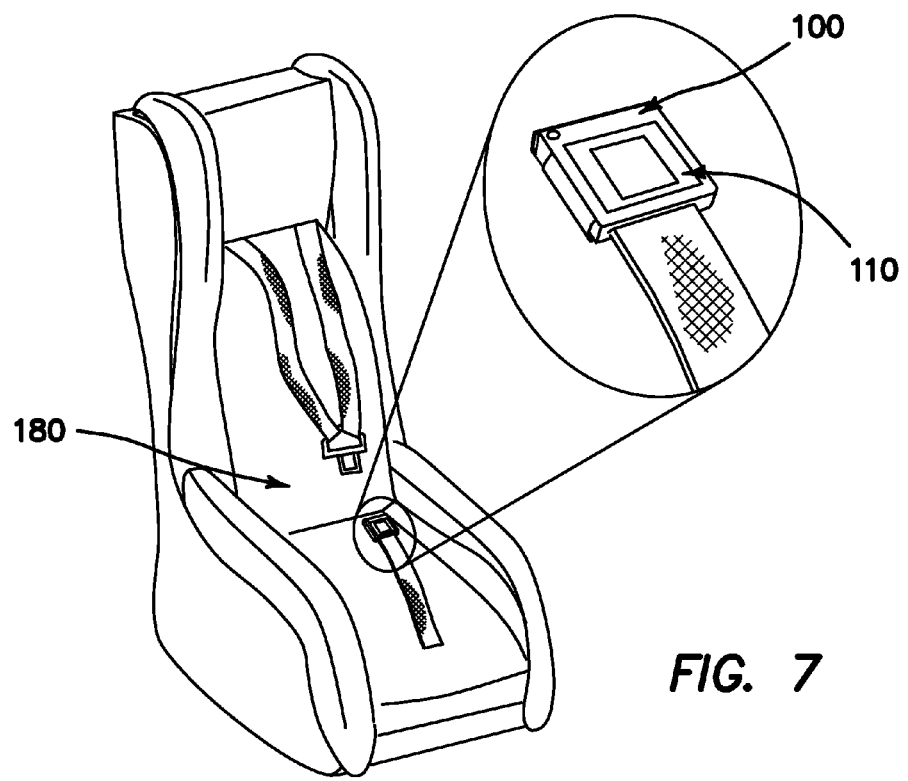
FIG. 7 illustrates a front perspective view of the bracket attached to a female receptacle of a seat belt system of an infant seat according to the embodiments of the present invention.

FIG. 6 illustrates a front perspective view of the bracket 100 attached to the female receptacle 110 of a seat belt system of a booster seat 175 according to the embodiments of the present invention. FIG. 7 illustrates a front perspective view of the bracket 100 attached to the female receptacle 110 of a seat belt system of an infant seat 180 according to the embodiments of the present invention.

Figure 8:
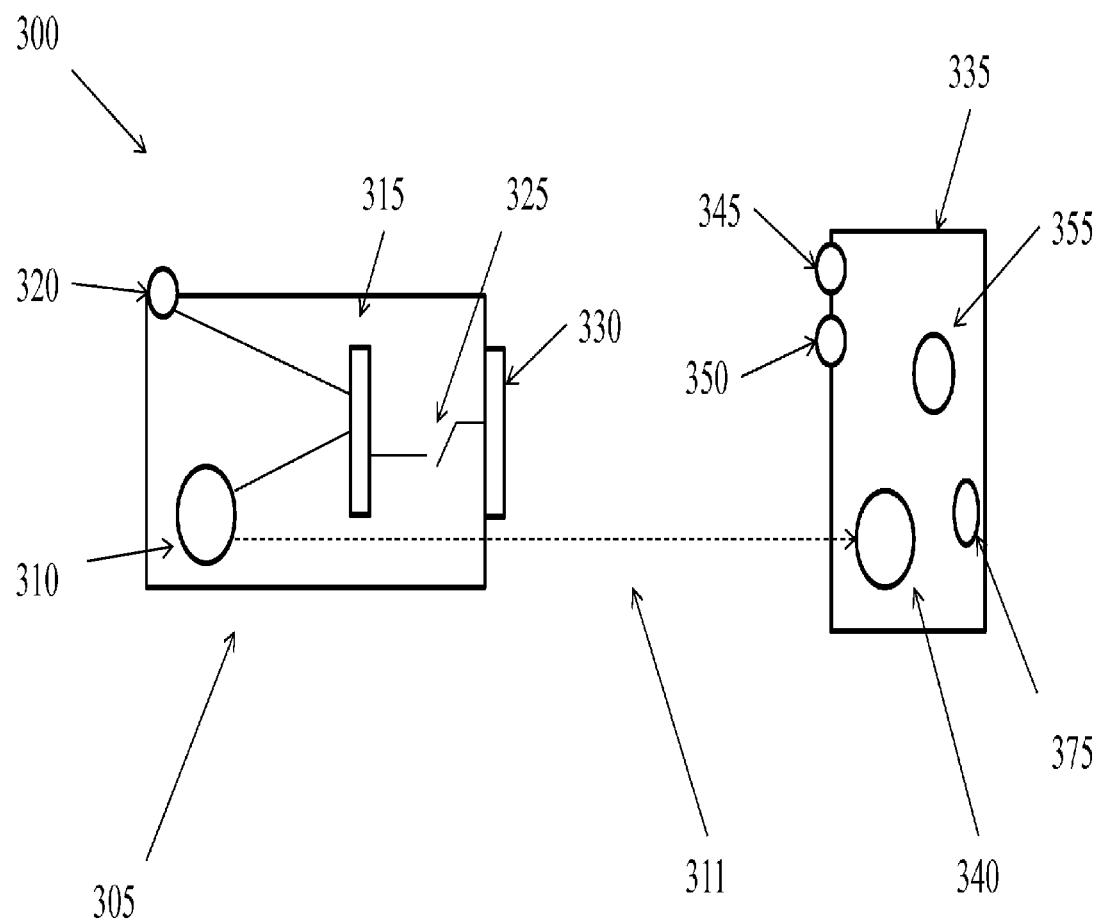
FIG. 8 illustrates a block diagram of a seat belt alarm system according to the embodiments of the present invention.

FIG. 8 illustrates a block diagram of a seat belt alarm system 300 according to the embodiments of the present invention. The seat belt alarm system 300 comprises a bracket 305, signal transmitter 310 integrated in said bracket 305, battery compartment 315 integrated into said bracket 305, indicator light 320 integrated in said bracket 305, switch 325, tension button 330, keychain fob 335, signal receiver 340 integrated in said keychain fob 335, green indicator light 345 integrated in said keychain fob 335, red indicator light 350 integrated in said keychain fob 335 and audible alarm 355 integrated in said keychain fob 335. When the switch 325 is closed by depression of the tension button 330, the signal transmitter 310 transmits a signal 311 received by said signal receiver 340.

FIG. 9 shows a flow chart 400 detailing one methodology of how the seat belt alarm system 300 works. At 405, the bracket 100 is attached to the female receptacle 110 of a seat belt system. At 410, the male bracket 114 is inserted into the locking slot 117 of the female receptacle 110. At 415, the tension button 130 is depressed by the male bracket 114 during insertion into the locking slot 117 and the switch 330 is closed by the tension button 130 being depressed thereby connecting power to the signal transmitter 310 and indicator light 320. At 420, the signal transmitter 310 begins transmitting its signal and indicator light 125 illuminates responsive to the switch 330 closing. At 425, the signal receiver in the keychain fob 150 begins receiving the transmitted signal 311. At 430, responsive to the signal being received, the green indicator light 345 illuminates. At 435, it is determined if the key fob 150 is in range. If so, at 440, it is determined if the seat belt alarm system is active. If not, at 445, the system is deemed inactive (i.e., seat belt unbuckled) caused by the male buckle 114 being disengaged from the female receptacle 110 while the keychain fob 150 was in range of the transmitted signal. If the seat belt alarm system 330 is found active at 440, the flow chart 400 loops back to 435. If, at 435, it is determined that the key fob 150 is out of range while the system is active (i.e., seat belt buckled), the red indicator light 350 illuminates, the green indicator light 345 turns off and the alarm 355 sounds. That is, a person remains restrained in the vehicle.

In another embodiment, an optional vibrator 375 may be incorporated into the keychain fob 150 to further place the user on alert when required.

In another embodiment, the bracket 100 and the keychain fob 150 may include means for alerting the user that the batteries are low. For example, the indicator light 125 integrated in the bracket 100 may flash responsive to a low power reading from the batteries or the passage of a predetermined time period commensurate with the performance specification of the batteries. Regarding the keychain fob 150, the red indicator light 155 and/or green indicator light 160 may flash and/or the audible alarm 355 may chirp and/or the vibrator 375 may intermittingly activate responsive to a low power reading from the batteries or the passage of a predetermined time period commensurate with the performance specification of the batteries. Other alerting means are suitable as well.

Although the invention has been described in detail with reference to several embodiments, additional variations and modifications exist within the scope and spirit of the invention as described and defined in the following claims.

I claim:

1. A seat belt alarm system comprising:
    a bracket configured to attach to, and disengage from, an exterior of a female receptacle of a seat belt system;
    a movable tension mechanism integrated in said bracket, said movable tension mechanism positioned on a face of said bracket proximate a locking slot of said female receptacle and external to said female receptacle for depression by a male buckle of a seat belt system when said male buckle is inserted into said locking slot of a female receptacle to which said bracket is attached;
    a signal transmitter integrated in said bracket, said signal transmitter activated responsive to said tension mechanism being in a depressed state;
    a signal receiver integrated in a key holding device, said signal receiver configured to receive a signal transmitted by said signal transmitter when said signal receiver is in range of said signal; and
    alert means integrated in said key holding device, said alert means configured to activate responsive to:
        (i) said signal transmitter being activated; and
        (ii) said signal receiver being out of range of said signal transmitter.

2. The seat belt alarm system of claim 1 wherein said key holding device is a keychain fob.

3. The seat belt alarm system of claim 1 wherein said alert means is an audible alarm.

4. The seat belt alarm system of claim 1 wherein said alert means is an indicator light.

5. The seat belt alarm system of claim 1 wherein said alert means is a vibration device.

6. The seat belt alarm system of claim 1 further comprising one or more hook and loop straps on said bracket.

7. A seat belt alarm system bracket configured for attachment to, and disengagement from, a female receptacle of a seat belt assembly, comprising:
    a first arm positioned to traverse a face of a female receptacle of a seat belt system when said bracket is attached to an exterior of a female receptacle;
    a second arm positioned to traverse a slot face of a female receptacle of a seat belt system when said bracket is attached to an exterior of a female receptacle;
    said second arm being substantially orthogonal to said first arm, said second arm defining a space for passage of a male buckle associated with a seat belt system when said bracket is attached to an exterior of a female receptacle;
    a tension mechanism positioned on a face of said bracket proximate a locking slot of said female receptacle and to be depressed by a male buckle when a male buckle is inserted into said locking slot of a female receptacle of a seat belt system, said tension mechanism external to a female receptacle when said bracket is attached to a female receptacle; and
    a signal transmitter, said signal transmitter activated responsive to said tension mechanism being in a depressed state.

8. The seat belt alarm system bracket of claim 7 further comprising an indicator light.

9. The seat belt alarm system of claim 7 further comprising a battery compartment.

10. The seat belt alarm system of claim 7 further comprising a switch controlled by said tension mechanism.

11. A seat belt alarm system comprising:
    a bracket including means for attachment to, and disengagement from, an exterior of a female receptacle of a seat belt system;
    a movable tension button integrated in said bracket, said tension button positioned on a face of said bracket proximate a locking slot of said female receptacle and external to said female receptacle for depression by a male buckle of a seat belt system when said male buckle is inserted into said locking slot of a female receptacle to which said bracket is attached;
    a switch integrated in said bracket and controlled by said tension button;
    a signal transmitter integrated in said bracket, said signal transmitter activated responsive to said tension mechanism being in a depressed state and closing said switch;
    a signal receiver integrated in a key holding device, said signal receiver configured to receive a signal transmitted by said signal transmitter when said signal receiver is in range of said signal; and
    alert means integrated in said key holding device, said alert means configured to activate responsive to:
        (iii) said signal transmitter being activated; and
        (iv) said signal receiver being out of range of said signal transmitter.

12. The seat belt alarm system of claim 11 wherein said key holding device is a keychain fob.

13. The seat belt alarm system of claim 11 wherein said alert means is an audible alarm.

14. The seat belt alarm system of claim 11 wherein said alert means is an indicator light.

15. The seat belt alarm system of claim 11 wherein said alert means is a vibration device.

16. The seat belt alarm system of claim 11 further comprising one or more hook and loop straps on said bracket.

\* \* \* \* \*